(12) United States Patent
Fuccello

(10) Patent No.: US 7,765,419 B2
(45) Date of Patent: Jul. 27, 2010

(54) SYSTEM AND METHOD FOR POWER MANAGEMENT IN MOBILE UNITS

(75) Inventor: James R. Fuccello, Patchogue, NY (US)

(73) Assignee: Symbol Technologies, Inc, Holtsville, NY (US)

( * ) Notice: Subject to any disclaimer, the term of this patent is extended or adjusted under 35 U.S.C. 154(b) by 281 days.

(21) Appl. No.: 11/022,909

(22) Filed: Dec. 27, 2004

(65) Prior Publication Data

US 2006/0140140 A1 Jun. 29, 2006

(51) Int. Cl.
*G06F 1/00* (2006.01)

(52) U.S. Cl. ............... 713/324; 713/300; 713/320; 713/322; 455/574

(58) Field of Classification Search ............. 370/338; 455/422.1, 574
See application file for complete search history.

(56) References Cited

U.S. PATENT DOCUMENTS

| | | | |
|---|---|---|---|
| 7,274,929 B1 * | 9/2007 | Banginwar | 455/418 |
| 2003/0074277 A1 * | 4/2003 | Foutz | 705/26 |
| 2003/0135769 A1 * | 7/2003 | Loughran | 713/310 |
| 2004/0039954 A1 * | 2/2004 | White et al. | 713/322 |
| 2004/0072559 A1 * | 4/2004 | Kakumaru et al. | 455/422.1 |
| 2004/0147274 A1 * | 7/2004 | Khawand et al. | 455/522 |
| 2004/0176140 A1 * | 9/2004 | Nishino et al. | 455/566 |
| 2005/0044436 A1 * | 2/2005 | Holle | 713/320 |
| 2005/0076256 A1 * | 4/2005 | Fleck et al. | 713/320 |
| 2006/0050670 A1 * | 3/2006 | Hillyard et al. | 370/338 |

FOREIGN PATENT DOCUMENTS

WO WO2006/071459 7/2006

OTHER PUBLICATIONS

International Preliminary Patentability Report in related case PCT/US2005/043863.

* cited by examiner

*Primary Examiner*—Vincent P Harper
*Assistant Examiner*—Mazda Sabouri

(57) ABSTRACT

Described is a method which includes receiving a selection of an application type, selecting a power management class as a function of the application type and adjusting resources of a mobile unit as a function the power management class.

12 Claims, 3 Drawing Sheets

SYSTEM AND METHOD FOR POWER MANAGEMENT IN MOBILE UNITS

BACKGROUND

Many mobile units ("MUs") (e.g., cell phones, PDAs, handheld PCs, etc.) are capable of wireless connection to a computer network, such as the Internet, a local network, a corporate network and others. As a result, these MUs do not require any wired connections to carry out their functions (e.g., email, web browsing, etc.). Batteries, particularly rechargeable batteries, are commonly used to power the MUs, since they provide complete freedom of movement to users of these devices. Alternatively, power adapters may be used to power the MUs using electrical sockets. However, this approach requires tethering the MUs to a stationary power supply with cords, reducing portability and usefulness.

Several conventional methods of power management have been employed which attempt to prolong a life of the battery. These conventional methods include power management at user, application, system and hardware levels. For example, at the user level, a user manages power by suspending or charging the MU when it is not in use. Also, manual adjustment of the peripherals (e.g., display, back-light, beeper) may be accomplished at the user level. Furthermore, at the application level, developers of the applications have had to design the applications to provide for power management. Developing power-management-aware applications requires significant expertise and represents considerable cost to manufacturers and users of the MUs.

SUMMARY OF THE INVENTION

A method which includes receiving a selection of an application type, selecting a power management class as a function of the application type and adjusting resources of a mobile unit as a function the power management class.

In addition, a method which includes selecting resources of a mobile unit which are utilized by an application loaded on the mobile unit, defining a power-down order of the selected resources and registering the application for a power management class of the mobile unit.

Furthermore, a device which includes a processor, a memory storing an application and a resource. The application is registered for a power management class and execution of the application by the processor causes the device to utilize the power management class which provides an adjustment to the resource.

DETAILED DESCRIPTION

Figure 1:
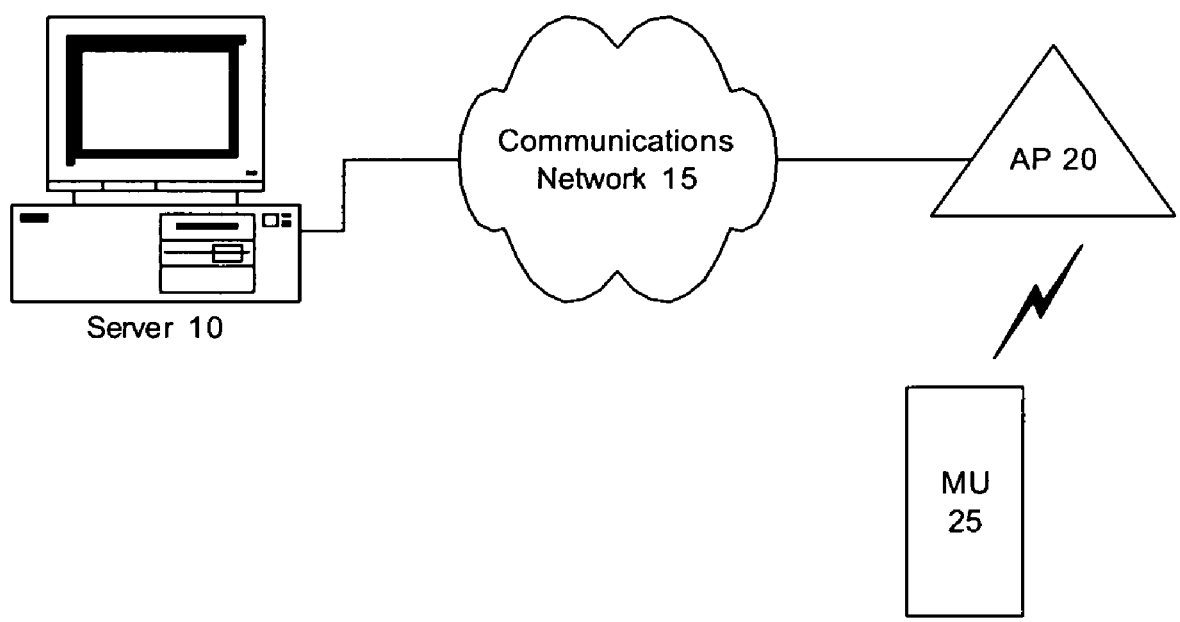
FIG. 1 shows an exemplary embodiment of a system for power management in mobile units according to the present invention.

The present invention may be further understood with reference to the following description and the appended drawings, wherein like elements are referred to with the same reference numerals. As shown in FIG. 1, the present invention may be utilized by a system 5 which includes a server 10 connected to a communications network 15 (e.g., LAN, WAN). An access point ("AP") 20 may have a wired connection to the network 15. The AP 20 may provide wireless access to the network 15 for a mobile unit ("MU") 25 (e.g., cell phone, PDA, laptop, handheld PC, scanner, etc.) through a wireless connection. As would be understood by those of skill in the art, any number of APs may be connected to the network 15, and any number of MUs may have a wireless connection to the AP 20.

The MU 25 may include one or more peripherals, for example, a display (e.g., LCD), a scanner, a back-light, a communications port, a PCMCIA storage, a network card, etc. The MU 25 may further include a battery which provides power to the MU 25, allowing it to perform various functions utilizing the peripherals and loaded software applications (e.g., web browsing, scanning, wireless communications, etc.). The battery may be a rechargeable battery (e.g., Li ion, Li polymer, NiCad, NiMh) or a single-use battery (e.g., alkaline). As understood by those skilled in the art, the rechargeable battery may be charged by connection of the MU 25 and/or the battery to an external power source (e.g., AC source, external battery). Also, the MU 25 may be powered by connection to the external power source, or a further power source (e.g., a USB port) which the MU 25 may derive power from without discharging the battery. Those skilled in the art would understand that the MU 25 may include hardware and/or software to recognize when it is connected to the external power source or the further power source, and thus, may derive power therefrom instead of the battery.

Each function performed by the MU 25 may be a result of an application executed by a processor in the MU 25. For example, a web-browsing function may be the result of one or more applications related to web-browsing (e.g., display, controls, network/Internet connection, etc.).

According to an exemplary embodiment of the present invention, a power management system provides that each application executed by the MU 25 may be registered for a power management class ("PMC"). The MU 25 may include any number of PMCs. The PMC may define a power state of the MU 25 in which the MU 25 adjusts its operation based on the function that is being or will be performed. That is, the MU 25 only uses an amount of power which is required to perform the function. The PMC may be predefined (e.g., OEM or developer created), custom (e.g., user created) and/or adaptable (e.g., changeable during operation of the MU 25).

An exemplary embodiment of the present invention will be described with reference to a web-browsing application and the web-browsing function. However, those of skill in the art would understand that the web-browsing application is merely illustrative of the application that may be registered for the PMC on the MU 25. Thus, the present invention provides for registration of any application (e.g., batch processing, radio communications, scanning, presentation, etc.) which may be executed by the MU 25.

According to an exemplary embodiment of the present invention, the MU 25 may include the web-browsing application which allows the user of the MU 25 to connect to and browse the public Internet (e.g., websites). The web browser application may use the peripherals of the MU 25, such as, for example, the display, the back-light and a network interface adapter (e.g., Spectrum24®, developed by Symbol Technologies, Inc., Holtsville, N.Y.). However, other peripherals, such as the scanner and the communications port, may not be utilized or may be utilized to a lesser extent during web browsing. Thus, the web-browsing application may be registered with a PMC which provides power to the display, the back-light and the network interface adapter, but removes power from the scanner and the communications port. The application may be registered for the PMC by the developer of the application, the manufacturer of the MU 25 or the user of the MU 25.

An exemplary embodiment of a software code which accomplishes registration of the web browsing application for the PMC is shown as follows:

```
typedef struct tagPowerClass
{
    uint        AppClass;
    int         EnableManagement;
    char        *DeviceList;
} POWERCLASS;
POWERCLASS MyPowerClass;
char MyDevices[5] =
{SCANNER,COMM,BEEPER,KEYBOARD,DISPLAY};
MyPowerClass.AppClass = (PRESENTATION|RADIO)
MyPowerClass.EnableManagement = TRUE;
MyPowerClass.DeviceList = MyDevices;
RegisterApp(AppHandle,MyPowerClass);
```

According to the exemplary embodiment, the display, the back-light and the network interface adapter are powered for a Presentation PMC, whereas the scanner and the communications are deprived of power in the Presentation PMC. As will be described further below, any number of PMCs may be utilized by the MU 25, and the PMCs may be predefined and/or customized for any number of peripherals, applications, MUs, etc.

Figure 2:
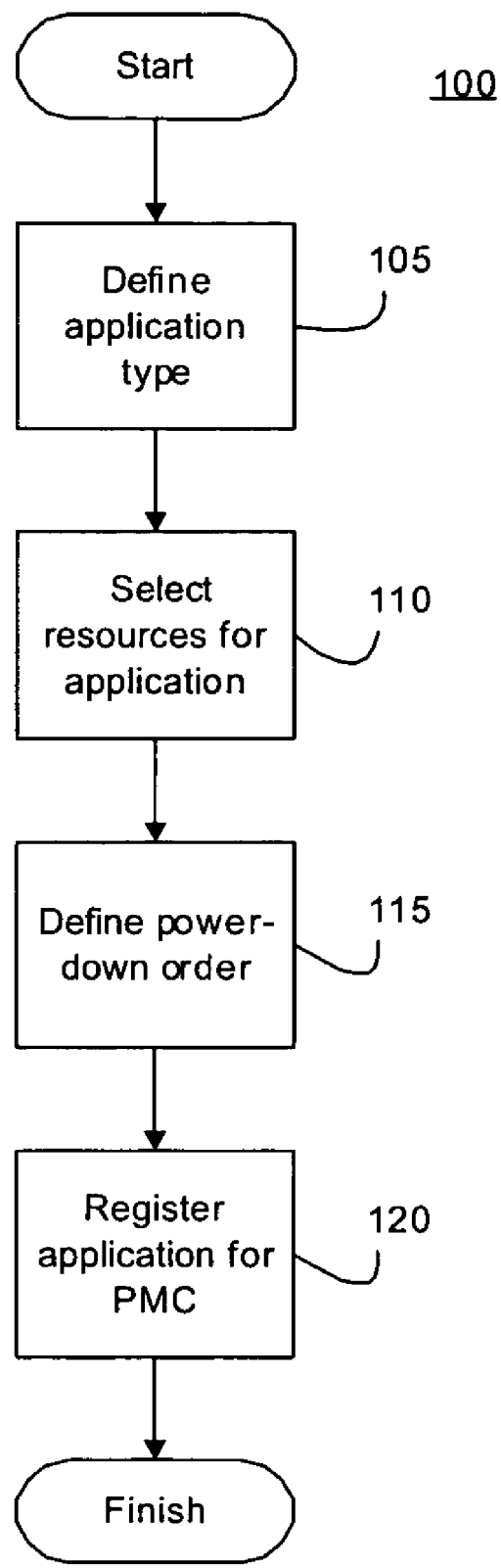
FIG. 2 shows an exemplary embodiment of a method for registering an application for a power management class according to the present invention.

An exemplary embodiment of a method 100 for registering the application for the PMC according to the present invention is shown in FIG. 2. As would be understood by those skilled in the art, registration of the application may be done by the developer (e.g., programmer) of the application, the manufacturer of the MU 25 and/or the user of the MU 25. In this manner, the user is not limited to those applications and/or PMCs that are predefined on the MU 25. The user may alter the predefined applications and/or PMCs, and the user may create additional applications and/or PMCs to be used by the MU 25. As understood by those skilled in the art, alterations to applications and/or user-created applications may be distributed to and employed by other MUs which utilize the network 15.

In step 105, an application type is defined. As understood by those skilled in the art, the application may be created (i.e., coded) prior to registration of the application for the PMC. The application type may, in general terms, indicate the function that the application will perform when executed. For example, the application type may be one or a combination of, for example, a batch processing type, a radio type (e.g., 802.11, Bluetooth), a scan-intensive type, a presentation type, etc. Those of skill in the art would understand that the application type is not limited to those described herein, but may be defined for any function performed by the MU 25. In following the exemplary embodiment described above with reference to the web-browsing application, the application type for the web-browsing application may indicate that it will perform the presentation type for reasons which are described below.

In step 110, resources of the MU 25 which the application may utilize are selected. Resources, as used herein, may encompass any feature of the MU 25 including, but not limited to, the peripherals, functions, components (e.g., processor, memory, I/O interface, clock), mechanisms (e.g., auto-disable), settings (e.g., high-speed processing, low-power back-light), etc. As noted above, the web-browsing application may indicate that it requires power to the display, the back-light and the network interface adapter, but does not require power to the scanner and the communications port. Further, the web-browsing application may indicate the settings for the peripherals. For example, the display and/or the back-light may be set to a certain brightness. Indication of the settings for the web-browsing application may be advantageous if, for example, the MU 25 is used only during daylight. Thus, the setting for the back-light may be at a lowest power state or not powered.

According to an exemplary embodiment of the present invention, the application may be customized and/or adapted. For example, the MU 25 may be used for a duration of time during evenings. Accordingly, the web-browsing application may indicate the setting of the back-light should be to a highest power state, which may allow the user to view a set of controls on the MU 25 in a dark or low-light environment. However, if the MU 25 is then used only during the daylight (e.g., the user switches shifts), the web-browsing application may indicate the setting for the back-light should be at the lowest power state or not powered. Therefore, the peripherals, functions, components, mechanisms and/or settings of the MU 25 may be predefined, but can be customized and/or adapted according to use of the MU 25.

In step 115, the application may define a power-down order for the resources selected. The power-down order may be employed when the battery is fully or nearly fully discharged, and/or during a period of inactivity of the MU 25. For example, the power-down order may be employed prior to the MU 25 executing an auto-disable mechanism, whereby the MU 25 "turns off" as a result of the battery being fully or nearly fully discharged and/or during the period of inactivity.

The power-down order may be defined such that power is supplied only to those resources that are utilized or likely to be utilized to carry out the function defined by the application. In the exemplary embodiment of the web-browsing application, the power-down order may be defined such that the resources which are not utilized or not likely to be utilized by the web-browsing application may be deprived of power prior to those resources that are utilized or likely to be utilized. Even when the resources that are not utilized have been completely deprived of power, the power-down order may indicate that the resources which are utilized may operate at a lowest power state while maintaining the web-browsing function. In this manner, the power-down order for the web-browsing application may be as follows (in order of the resource deprived of power first): the back-light, the display, the network interface adapter. As indicated, the back-light may be completely deprived of power before the display is affected. Once, the back-light has been completely deprived of power, the power-down order may indicate that the display should be set to the lowest power state (e.g., lowest brightness level) before being completely deprived of power. As would be understood by those skilled in the art, when the display and/or the network interface adapter is completely deprived of power, the web-browsing application may cease, until the battery is recharged or replaced.

In step 120, the application is registered for the PMC as a function of the application type, the resources selected and/or the power-down order. As noted above, the web-browsing application may be registered for the Presentation PMC. In this manner, once the MU 25 receives an indication that it will be performing the web-browsing function, the MU 25 may provide power to the display, the back-light and/or the network interface adapter and remove power from the scanner and/or the communications port. Thus, the MU 25 may adjust power supplied to the resources based on the indication of the function it will perform.

Figure 3:
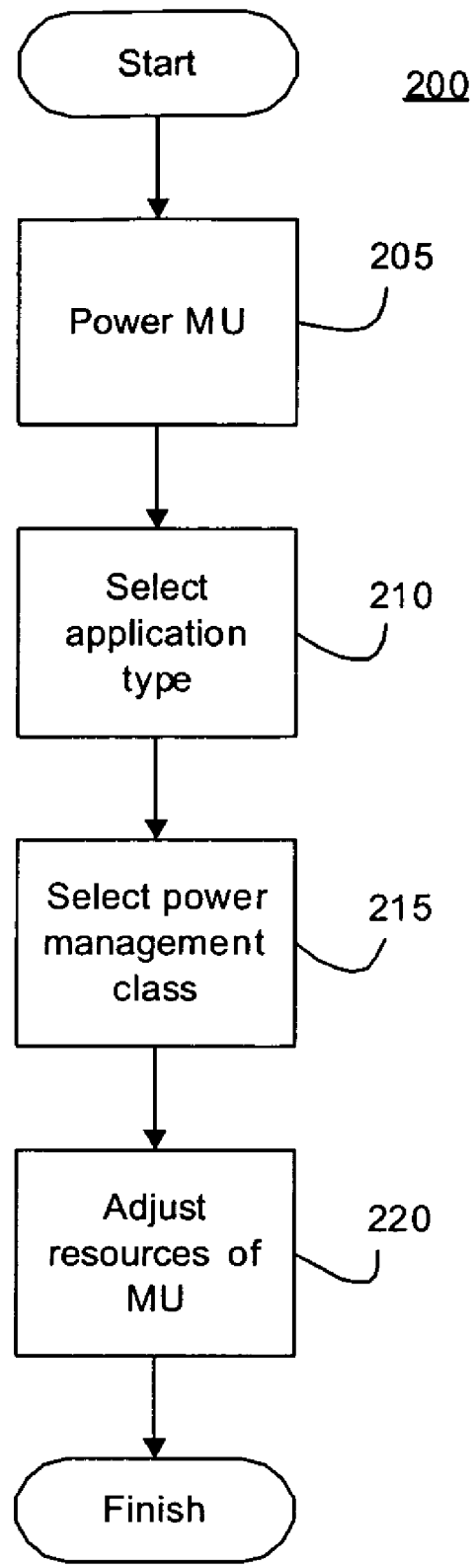
FIG. 3 shows an exemplary embodiment of a method employing a power management system according to the present invention.

An exemplary embodiment of a method 200 which employs the power management system according to the present invention is shown in FIG. 3. In step 205, the MU 25 is turned on. As understood by those of skill in the art, the MU 25 may be continuously on and simply connected to an external power source when not in use (e.g., AC source, external battery, etc.). Alternatively, the MU 25 may be turned off or enter a power-save mode when not in use (e.g., end of a workday or a shift) and turned on prior to use. Typically, the MU 25 is removed from the external power source when in use, and, as such, relies on the battery for power.

In step 210, the application type of the MU 25 may be selected. In one exemplary embodiment, the user manually selects the application type. For example, at a beginning of the shift, the user may disconnect the MU 25 from the external power source, turn on the MU 25, and manually select the application type via a user interface on the MU 25 (e.g., a button, a touchscreen, a code, etc.). Thus, the MU 25 may present a list of application types to the user and/or the user may enter a code which indicates the application type. In a further exemplary embodiment, the MU 25 is dedicated to one application type. That is, the MU 25 may be used only for web-browsing, whereas a further MU may be used only for scanning. In this embodiment, the MU 25 may not have display. As such, the application type may be selected at an application boot time through a call to an application program interface ("API"). In yet a further exemplary embodiment, the application type may be selected by the server 10 and/or a further device connected to the network 15. The application type may then be transmitted to and employed by the MU 25. As would be understood by those skilled in the art, the user may be presented with the application type selected by the server 10. If the application type is inconsistent with an intended use of the MU 25, the user may override the selection and select a further application type.

In step 215, the MU 25 selects the PMC as a function of the application type selected. The MU 25 may further display the PMC selected to the user. As noted above, if the user selects the application type for the web-browsing application, the MU 25 may enter the Presentation PMC. Thus, for every application type that may be selected, the PMC corresponding to the application type is selected by the MU 25. In a further exemplary embodiment of the present invention, the user may select more than one application type. For example, the user may indicate that the MU 25 will be used for both web-browsing and scanning. In this manner, the MU 25 may switch between the PMCS for each application type. That is, when scanning the MU 25 may be in a Scan PMC, whereas the MU 25 switches to the Presentation PMC when web-browsing. Alternatively, the MU 25 may select the PMC which most closely corresponds to the application types selected by the user. For example, a hybrid PMC may have been defined which manages power for the MU 25 when simultaneously web-browsing and scanning. Thus, in either instance, the user need only select the application type to have the MU 25 select the PMC.

In yet a further exemplary embodiment, the user may manually select the PMC after selecting the application type. This may occur when, for example, the user notices that, for some reason, the PMC selected by the MU 25 corresponding to the application type selected by the user is not as efficient (i.e., uses more power, discharges battery faster, etc.) as the further PMC. Thus, the user may manually select the PMC and/or re-register the application type for the further PMC.

In step 220, the resources of the MU 25 are adjusted based on the PMC selected. With reference to the web-browsing application, the Presentation PMC may be selected. As such, the MU 25 may supply power to the display, the back-light and the network interface adapter, and remove power from the scanner and the communications port. The PMC may remain in effect for a duration of time in which the application is being used (i.e., while web-browsing) or may potentially be used. Thus, if the battery begins to lose power, the PMC may implement the power-down order associated with the application type. As stated above with regard to selection of the PMC, the user may manually adjust the resources of the MU 25 before or after the PMC is selected. Thus, the PMC is customizable based on experience of the user (e.g., usage statistics).

In a further exemplary embodiment of the present invention, the server 10 may provide the MU 25 and any other MU connected to the network 15 with the application types and/or the PMCs, and/or adjustments to the application types and/or the PMCs. For example, the server 10 may indicate that the MU 25 should have a further application type and/or the further PMC. The server 10 may further indicate that the application types and/or the PMCs should be adjusted. Thus, when the MU 25 establishes connection to the network 15, the further application type, the further PMC and/or the adjustments may be transmitted to the MU 25. The server 10 may provide further application types, further PMCs and/or adjustments based on data received from the MUs, developers, users or manufacturers. As understood by those of skill in the art, the data may include power consumption for the PMC, power consumption for the application type, battery life, battery age, etc. For example, the server 10 may indicate that for batteries past a certain age, the resources used for the applications should be set to the lowest power state while remaining functional.

In yet a further exemplary embodiment of the present invention, a program may be utilized which facilitates registration of the application for the PMC. The program may recognize input such as, the application type, the resources selected and/or the power-down order defined. As a function of the input, the program may select the PMC. Those of skill in the art would understand that the program may make a selection at each step in the registration of the application based on the input. For example, the application type may be the web-browsing application. The program may select and preliminarily adjust resources which may be utilized by the web-browsing application. Then, the program may define the power-down order for the application based on the application type and the selected resources. Finally, the program may select the PMC based on the application type, the selected resources and the power-down order. As would be understood by those skilled in the art, the preliminarily adjustments, the power-down order and/or the PMC may be customized.

As can be seen from the exemplary embodiments, the present invention simplifies power management for users and/or applications, while providing a sophisticated power management system for an MU. This is accomplished by relieving users and applications from deciding when and how to control power. For example, in the past, users would have to constantly monitor all of the subsystems and make necessary changes through a variety of application program interfaces (APIs) and/or Graphical user interfaces (GUIs). The exemplary embodiments of the present invention described above allow for the simple registration of an application for a defined power class and then allowing the power manager to handler power management for the application.

The present invention has been described with reference to the MU 25, the application, and the PMC. Accordingly, various modifications and changes may be made to the embodiments without departing from the broadest spirit and scope of the present invention as set forth in the claims that follow. The specification and drawings, accordingly, should be regarded in an illustrative rather than restrictive sense.

What is claimed is:

1. A method, comprising:
   registering an application with a power management class, the application identifying a first plurality of resources required by the application;
   presenting a list of application types on a display of a mobile unit;
   receiving a selection of the application type for the application;
   selecting the power management class as a function of the application type, the power management class including the first plurality of resources of the mobile unit to be powered for the application type;
   providing power to the first plurality of resources and powering down a second plurality of resources of the mobile unit until a further selection of a further application type is received, wherein receiving a selection of the application type for the application comprises receiving a plurality of application types associated with the application, and wherein selecting the power management class as a function of the application type comprises selecting the power management class that corresponds most closely to the application types.

2. The method according to claim 1, wherein the application type is associated with one or more applications executable by the mobile unit.

3. The method according to claim 1, wherein the selection of the application type is accomplished by one of a user, a server, a network device and a further mobile unit.

4. The method according to claim 1, wherein the selection of the application type is accomplished via a user interface.

5. The method according to claim 4, wherein the user interface is one of a button, a touchscreen and a code.

6. The method according to claim 1, wherein more than one application type is selected and the power management class is selected as a function of the more than one application types.

7. The method according to claim 1, wherein at least one of the first and the second plurality of resources of the mobile unit includes at least one of a peripheral, a function, a component, a mechanism and a setting.

8. A method, comprising:
   presenting a list of application types on a display;
   associating a plurality of application types from the list with an application, the application types each identifying a plurality of resources required by the application;
   selecting the plurality of resources of a mobile unit which are utilized by the application loaded on the mobile unit;
   defining a power-down order of the plurality of resources; and
   registering the application for a power management class that most closely corresponds to the plurality of application types.

9. The method according to claim 8, further comprising:
   associating one or more applications with an application type.

10. The method according to claim 8, wherein the plurality of resources of the mobile unit include at least one of a peripheral, a function, a component, a mechanism and a setting.

11. The method according to claim 8, wherein the application is registered for the power management class as a function of one of the resources selected and the power-down order.

12. The method according to claim 9, wherein the one or more applications are registered for the power management class as a function of the application type.

* * * * *